H. KOPPERS.
PROCESS OF PRODUCING SULFATE OF AMMONIA FROM AMMONIACAL GASES OR VAPORS.
APPLICATION FILED FEB. 4, 1913.
1,073,247.
Patented Sept. 16, 1913.
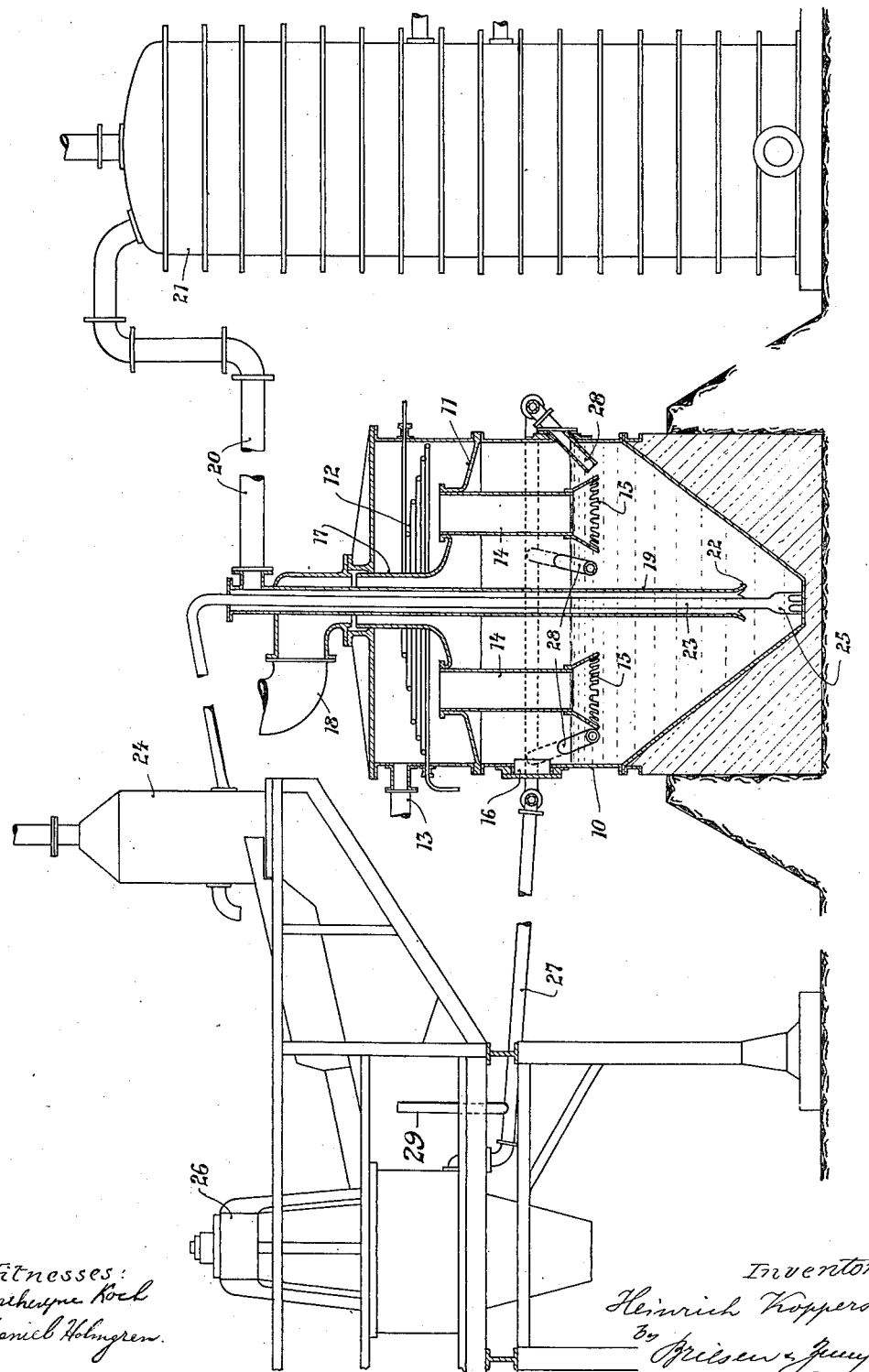

UNITED STATES PATENT OFFICE.

HEINRICH KOPPERS, OF ESSEN-ON-THE-RUHR, GERMANY.

PROCESS OF PRODUCING SULFATE OF AMMONIA FROM AMMONIACAL GASES OR VAPORS.

1,073,247.  Specification of Letters Patent.  Patented Sept. 16, 1913.

Application filed February 4, 1913. Serial No. 746,099.

*To all whom it may concern:*

Be it known that I, HEINRICH KOPPERS, a subject of the King of Prussia, and residing at 29 Moltkestrasse, Essen-on-the-Ruhr, Germany, have invented a certain new and useful Improved Process of Producing Sulfate of Ammonia from Ammoniacal Gases or Vapors, of which the following is a specification.

This invention relates to a novel process of obtaining sulfate of ammonia from ammoniacal gases and vapors, in the form of a neutral salt without entailing any loss of ammonia.

As is well known, the usual method of producing sulfate of ammonia in bulk consists in either bringing the ammoniacal gas or the ammoniacal vapors from gas works liquor into intimate contact with sulfuric acid. When manufacturing in large quantities, however, it is impossible to bring together the sulfuric acid and ammonia in that proportion which corresponds with the chemical reaction represented by the equation $$2NH_3 + H_2SO_4 = (NH_4)_2SO_4.$$

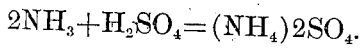

The amount of ammonia in the gases or vapors varies, and it is impossible to distribute the sulfuric acid, even with the aid of special mixing devices, with such exactitude that each molecule of sulfuric acid becomes saturated with two molecules of ammonia. In view of the great danger of free ammonia escaping with the gases and vapors, it is always necessary to make the saturation both slightly acid in order that the whole of the ammonia is retained. There is however, again the possibility of the prepared salt containing free acid, *i. e.* of it being acid. This difficulty is overcome according to the present invention, by retaining an excess of acid at that part of the bath where the fresh acid and the mother liquor, separated from the previously formed salt, enter the same and where the gases and vapors deprived of ammonia leave the bath, this excess being sufficient to insure that all the ammonia in the gases is retained with certainty. By introducing the other part of the ammoniacal gases or vapor at or close to the place of withdrawal of the salt, the free acid can be completely neutralized, and a neutral salt be obtained. At this point the ammonia may also be used in excess, since the risk of loss of ammonia is obviated by an adequate excess of acid.

Apparatus suitable for carrying the improved method into effect is illustrated in the accompanying drawing, which shows the apparatus in vertical section.

The saturation vessel 10 is divided into two compartments by a partition wall 11, the upper compartment containing a coiled heating pipe 12, and having an inlet pipe 13. Downwardly directed pipes 14 provided with flared, serrated mouths 15, depend from the partition 11, and the mouths 15 lie somewhat below the surface of the saturation bath in the vessel 10. Manholes 16 give access to the interior of the vessel 10. The partition 11 has a tubular neck 17 connecting the lower compartment to the gas discharge pipe 18. Passing through the neck 17 is a pipe 19, which communicates at the top by means of a pipe 20 with the distilling column 21, and is provided at its lower end with a flared, serrated mouth 22. Inside the pipe 19 is the suction pipe 23 of an ejector 24, said pipe 23 having a bell shaped mouth 25 at its lower end. Adjacent to the ejector 24 is a centrifugal drier 26, the discharge pipe 27 of which leads back to the saturation vessel, and discharges by means of a plurality of delivery pipes 28, into the saturation vessel close to the level of liquid therein. Into pipe 27 opens a branch pipe 29 through which fresh acid may be introduced into pipe 27.

The ammoniacal gases from the retort or oven, having been previously freed from tar and preferably cooled, pass through the pipe 13 into the saturation vessel 10 above the partition base 11, and are there heated by the coiled pipe 12. The gases then pass down the tubes 14 and through the mouths 15 into the saturation bath, where the ammonia which they contain is absorbed, the gases then escaping through the central neck 17 to the pipe 18 for further use. The ammonia in the gas liquor formed by the previous cooling of the gas is removed in the distilling column 21 by means of lime and steam. The vapors from the column 21 pass through the pipe 20 into the inner pipe 19 and through the mouth 22 into the saturation bath, whereupon after absorption of the ammonia they escape with the gases through pipe 18. The salt formed accumulates at the bottom of the saturation vessel 10 around the bell 25, and is raised in the form of a slimy mass by the ejector 24, whence it passes into the centrifugal drier, by which the mother liquor is separated from the salt. This liquor flows through pipes 27, 28 into vessel 10 together with the necessary supply of fresh acid that is introduced into pipe 27 through branch 29. The absorption of the ammonia takes place in two stages. Owing to the addition of fresh acid to the mother liquid that enters the saturation vessel 10 through pipes 28, there exists within said vessel at the corresponding liquid level a certain excess of acid, so that all the ammonia passing said level will be absorbed. As the salt is withdrawn through the bell 25 from the bottom of the vessel 10, the liquid circulates from the top to the bottom, so that the acid lye containing salt descends to the part where the ammonia enters from the distilling column. This saturates the free acid in the lye or salt, so that the prepared salt is kept as neutral as it possibly can be. Owing to the introduction of an excess of ammonia at this part the ammonia remains uncombined. This however is not detrimental since this ammonia must subsequently pass the acid zone, where it will be combined.

By admitting the retort gases into the saturation bath near its liquid level, the important advantage is obtained that the pressure of these gases need not be objectionably raised. The pressure of the vapors coming from the distilling column, however, may be readily increased so as to overcome the pressure existing at the bottom of chamber 10, for instance by increasing the pressure in the distilling column.

What I claim as my invention and desire to secure by Letters Patent of the United States is:—

1. The process of producing sulfate of ammonia, consisting in introducing a part of the ammoniacal gas or vapor into a zone of a saturation bath in which an excess of acid is obtained by the admission of the fresh acid, and separately introducing the remainder of the vapor or gas at another part of the bath where it produces a neutral zone from which the salt is continuously removed.

2. The process of producing sulfate of ammonia, consisting in introducing a part of the ammoniacal gas or vapor near the surface of a saturation bath, where the fresh acid is also added and separately introducing the remainder of the vapor or gas into the saturation bath in proximity to the bottom thereof, where it produces a neutral zone, from which the prepared salt is removed.

3. The process of producing sulfate of ammonia, consisting in introducing cooled ammoniacal gas free from tar in proximity to the surface of a saturation bath, where the fresh acid is also added, the ammoniacal liquor separated by the cooling being treated in a distilling column, and the vapors produced therefrom being introduced into the saturation bath in proximity to the bottom thereof, where the salt is removed.

HEINRICH KOPPERS.

Witnesses:
    MAX SOMMER,
    AUGUST FUGGER.